US008903888B1

(12) United States Patent
Hyser et al.

(10) Patent No.: US 8,903,888 B1
(45) Date of Patent: Dec. 2, 2014

(54) RETRIEVING DATA OF A VIRTUAL MACHINE BASED ON DEMAND TO MIGRATE THE VIRTUAL MACHINE BETWEEN PHYSICAL MACHINES

(75) Inventors: Chris D. Hyser, Victor, NY (US); Bret A. McKee, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2394 days.

(21) Appl. No.: 11/588,683

(22) Filed: Oct. 27, 2006

(51) Int. Cl.
G06F 15/16 (2006.01)
G06F 15/167 (2006.01)
G06F 9/46 (2006.01)

(52) U.S. Cl.
USPC ........... 709/202; 709/212; 709/216; 709/232; 718/104; 718/105

(58) Field of Classification Search
USPC ................. 709/212–216, 232, 248, 201, 202; 711/6; 718/1, 104–105
See application file for complete search history.

(56) References Cited

U.S. PATENT DOCUMENTS

| | | | | |
|---|---|---|---|---|
| 6,421,739 | B1 * | 7/2002 | Holiday | 719/330 |
| 6,795,966 | B1 * | 9/2004 | Lim et al. | 718/1 |
| 6,802,062 | B1 * | 10/2004 | Oyamada et al. | 718/1 |
| 6,944,699 | B1 | 9/2005 | Bugnion et al. | |
| 7,085,825 | B1 * | 8/2006 | Pishevar et al. | 709/221 |
| 7,203,944 | B1 * | 4/2007 | van Rietschote et al. | 718/104 |
| 7,480,908 | B1 * | 1/2009 | Tene et al. | 718/1 |
| 7,484,208 | B1 * | 1/2009 | Nelson | 718/1 |
| 2002/0194389 | A1 | 12/2002 | Worley, Jr. et al. | |
| 2003/0037092 | A1 * | 2/2003 | McCarthy et al. | 709/104 |
| 2004/0010787 | A1 * | 1/2004 | Traut et al. | 718/1 |
| 2005/0246505 | A1 | 11/2005 | McKenney et al. | |
| 2005/0268298 | A1 * | 12/2005 | Hunt et al. | 718/1 |
| 2005/0278722 | A1 | 12/2005 | Armstrong et al. | |
| 2006/0005189 | A1 * | 1/2006 | Vega et al. | 718/1 |
| 2006/0023884 | A1 | 2/2006 | McKee | |
| 2006/0041733 | A1 | 2/2006 | Hyser | |
| 2006/0101189 | A1 * | 5/2006 | Chandrasekaran et al. | 711/6 |
| 2006/0149906 | A1 | 7/2006 | Misra | |
| 2006/0161911 | A1 * | 7/2006 | Barrs et al. | 717/170 |
| 2006/0195715 | A1 * | 8/2006 | Herington | 714/4 |
| 2006/0200819 | A1 | 9/2006 | Cherkasova et al. | |
| 2006/0200820 | A1 | 9/2006 | Cherkasova et al. | |
| 2006/0200821 | A1 | 9/2006 | Cherkasova et al. | |
| 2007/0283347 | A1 * | 12/2007 | Bobroff et al. | 718/1 |

OTHER PUBLICATIONS

MVware Technology Network, "VMware VirtualCenter 1.2 Support Documentation," http://www.vmware.com/support/vc12/doc/c13migrationover.html, 16 pages (at least as early as Oct. 25, 2006).
Wikipedia definition of "Virtual machine," http://en.wikipedia.org/wiki/Virtual_machine, pp. 1-6 (at least as early as Sep. 6, 2006).
TheFreeDictionary definition of "Virtual Machine," http://computing-dictionary.thefreedictionary.com/virtual%20machine, pp. 1-3 (at least as early as Sep. 6, 2006).
Wikipedia definition for "Hypervisor," http://en.wikipedia.org/wiki/Hypervisor, pp. 1-2 (at least as early as Sep. 6, 2006).

* cited by examiner

*Primary Examiner* — Luat Phung
*Assistant Examiner* — Kai Chang (57) ABSTRACT

To migrate a virtual machine from a first physical machine to a second physical machine over a network, execution of the virtual machine in the first physical machine is stopped, where the first physical machine contains data associated with the virtual machine. State information of the virtual machine is copied from the first physical machine to the second physical machine, and execution of the virtual machine is started on the second physical machine based on the copied state information.

17 Claims, 4 Drawing Sheets

RETRIEVING DATA OF A VIRTUAL MACHINE BASED ON DEMAND TO MIGRATE THE VIRTUAL MACHINE BETWEEN PHYSICAL MACHINES

BACKGROUND

Virtual machines can be provided in a computer to enhance flexibility and performance. A virtual machine typically refers to some arrangement of components (software and/or hardware) for virtualizing or emulating an actual computer, where the virtual machine can include an operating system and software applications. Virtual machines can allow different operating systems to be deployed on the same computer, such that applications written for different operating systems can be executed in different virtual machines (that contain corresponding operating systems) in the same computer. Moreover, the operating system of a virtual machine can be different from the host operating system that may be running on the computer on which the virtual machine is deployed.

In addition, a greater level of isolation is provided between or among applications running in different virtual machines. In some cases, virtual machines also allow multiple applications to more efficiently share common resources (processing resources, input/output or I/O resources, and storage resources) of the computer For enhanced performance, virtual machines can be provided on multiple computers that are interconnected by a network. Under certain scenarios, migration of virtual machines between or among physical machines may be desirable. Conventionally, when migrating a virtual machine from a first computer to a second computer, the data associated with the virtual machine on the first computer is typically pushed (copied) across the network to the second computer prior to the virtual machine being migrated. The amount of data associated with the virtual machine on the first computer can be relatively large. As a result, the amount of time involving in pushing the data of the virtual machine from the first computer to the second computer can be relatively large. During this time, some portion of the data on the first computer may be modified (since the virtual machine is still executing on the first computer). The modified data portion will have to be pushed across the network to the second computer. If the original version of the modified data portion had previously been copied from the first computer to the second computer, then the subsequent copying of the modified data portion is duplicated effort that is wasteful of computing and networking resources.

SUMMARY

In general, according to some embodiments, a virtual machine can be migrated from a first physical machine to a second physical machine without first having to copy memory data of the virtual machine on the first physical machine to the second physical machine. The memory data can be retrieved in response to demand by the virtual machine executing in the second physical machine.

Other or alternative features will become apparent from the following description, from the drawings, and from the claims.

BRIEF DESCRIPTION OF THE DRAWINGS

Some embodiments of the invention are described with respect to the following figures.

DETAILED DESCRIPTION

In accordance with some embodiments, a virtual machine can be migrated from a first (origination) physical machine to a second (destination) physical machine by performing the following: stop execution of the virtual machine in the first physical machine, where the first physical machine contains data associated with the virtual machine; copy state information of the virtual machine from the first physical machine to the second physical machine; start execution of the virtual machine in the second physical machine based on the state information; and retrieve, in response to demand by the virtual machine executing in the second physical machine, the data associated with the virtual machine from a source on the network. Although reference is made to "network" in the discussion, it is noted that some embodiments can be used with other types of interconnects. The "state information" of the virtual machine refers to state information stored in a central processing unit (CPU) (or multiple CPUs), input/output (I/O) device(s), and other components of a physical machine, where the state information defines the execution state of the virtual machine. The "data" associated with the virtual machine refers to software instructions and/or actual data (such as user data, application data, or system data) associated with the virtual machine. The data is the memory data of the virtual machine, where the memory data is data contained in memory.

The source on the network from which the data associated with the virtual machine is retrieved includes any one or more of the following: the origination physical machine; a backing store; and another physical machine.

According to some embodiments, the virtual machine can be migrated between physical machines in a relatively quick manner by stopping the virtual machine in the origination physical machine and starting the virtual machine in the destination physical machine even though all data associated with the virtual machine on the origination physical machine is not yet transferred to the destination physical machine. The data associated with the migrated virtual machine is transferred to the destination physical machine on a demand basis (in response to demand from the virtual machine executing in the destination physical machine). A benefit offered by the demand-based retrieval of data associated with the migrated virtual machine is that if the migrated virtual machine does not request any portion of the data associated with the virtual machine, then such portion does not have to be transferred to the destination physical machine, which reduces consumption of network resources. Note that some portion of the data associated with the migrated virtual machine may not be needed immediately by the virtual machine that is executed on the destination physical machine; therefore, such data may be transferred when convenient, or can be flushed to a backing store. A further benefit is that repeated transfers of the same portions (such as different versions of the same portion) of data from the origination physical machine to the destination physical machine is avoided.

According to an embodiment, the demand-based transfer of data to the destination physical machine is based on a demand paging technique, where pages of data are retrieved in response to demand from the virtual machine executing on the destination physical machine. A "page" of data refers to some predefined block of data. "Demand paging" refers to a process in which pages of data are copied from a source to a destination only if an attempt is made to access such pages. According to some embodiments, each of the physical machines includes a page-fault handling module to handle a page-fault condition in which a page of data requested by the virtual machine is not present in memory such that the page of data has to be retrieved from some other source. The demand paging technique is an example of a lazy transfer or lazy migration technique in which pages of data are not transferred to the destination physical machine until demand exists for such pages.

In addition to demand-based technique of retrieving virtual machine data, a background process of retrieving virtual machine data can also be employed. The background process can incrementally retrieve data for the migrated virtual machine when physical machine and network resources are available.

In the ensuing discussion, reference is made to retrieving pages of data in response to demand when migrating a virtual machine between physical machines. Note, however, that in other implementations, other predefined "portions" of data can be employed rather than pages. A "portion" of data refers to any predefined or arbitrary segment of data (software instructions and/or actual data) associated with a virtual machine.

Figure 1:
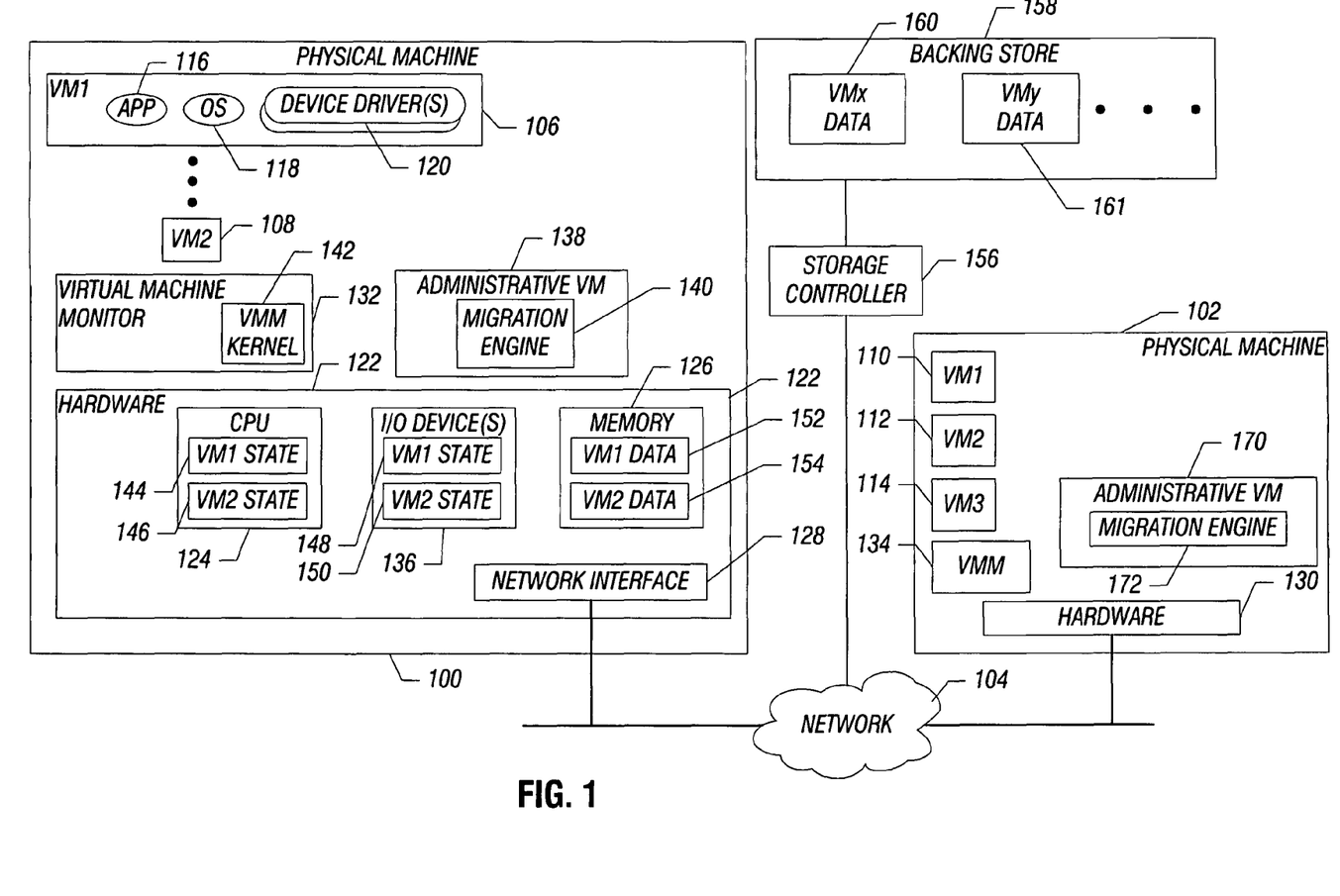
FIG. 1 is a block diagram of a system of physical machines on which virtual machines are deployed, where the physical machines further include mechanisms to allow for efficient transfer of data associated with the virtual machines during migration of the virtual machines, in accordance with some embodiments.

FIG. 1 illustrates a system that includes multiple physical machines 100, 102 that are interconnected by a network 104. Examples of the network 104 include a local area network (LAN), a wide area network (WAN); the Internet, or any other type of communications link. The physical machines can be located within one cabinet (or rack), or alternatively, the physical machines can be located in multiple cabinets (or racks). The network 104 can also include system buses or other fast interconnects. The system depicted in FIG. 1 can be any one of a data center, an application server farm, a storage server farm (or storage area network), a web server farm, a switch or router farm, and so forth. Although just two physical machines are depicted in FIG. 1, it is noted that more than two physical machines can be utilized in other implementations. Examples of the physical machines include computers (e.g., application servers, storage servers, web servers, etc.), communications modules (e.g., switches, routers, etc.), and other types of machines. "Physical machine" indicates that the machine is an actual machine made up of software and hardware. Although each of the physical machines is depicted as being contained within a box, it is noted that a physical machine can be a distributed machine having multiple nodes that provide a distributed and parallel processing system.

Within each of the physical machines are various virtual machines (VMs). In the example of FIG. 1, two virtual machines 106, 108 are depicted in the physical machine 100, and three virtual machines 110, 112, and 114 are depicted in the physical machine 102. Note that the numbers of virtual machines in each physical machine shown in FIG. 1 are provided for purposes of example, as different implementations can employ different numbers (one or more) of virtual machines in the corresponding physical machines.

A virtual machine refers to some partition or segment (made up of software and/or hardware) of the physical machine that is provided to virtualize or emulate a physical machine. From the perspective of a user, a virtual machine looks just like a physical machine. As depicted in FIG. 1, according to some embodiments, the virtual machine 106 includes one or more software applications 116, an operating system 118, and one or more device drivers 120 (which are typically part of the operating system 118). The other virtual machines 108, 110, 112, 114 can also contain software applications, operating systems, and device drivers.

It is noted that the operating systems that are part of corresponding virtual machines within a physical machine can be different types of operating systems or different versions of an operating system. This allows software applications designed for different operating systems to execute on the same physical machine.

The virtual machines within a physical machine are designed to share the physical resources of the physical machine. In the physical machine 100, these physical resources include hardware 122, which includes one or more central processing units (CPUs) 124, memory (volatile memory and/or persistent storage such as disk-based storage) 126, a network interface 128, input/output (I/O) device(s) 136, and other resources. Hardware 130 in the physical machine 102 contains similar components.

The physical machine 100 also includes a virtual machine monitor (VMM) 132, also called a hypervisor, which manages the sharing (by virtual machines 106, 108) of the physical resources, including the hardware 122, of the physical machine 100. The VMM 132 virtualizes the physical resources, including the hardware 122, of the physical machine 100. Also, the VMM 132 intercepts request for resources from operating systems in the respective virtual machines 106, 108 so that proper allocation of the physical resources of the physical machine 100 can be performed. For example, the VMM 132 manages memory access, input/output (I/O) device access, and CPU scheduling for the virtual machines. Effectively, the VMM 132 provides an interface between the operating system of each virtual machine and the underlying hardware 122 of the physical machine 100. The interface provided by the VMM 132 to an operating system of a virtual machine is designed to emulate the interface provided by the actual hardware of the physical machine 100.

The physical machine 102 similarly includes a VMM 134 that provides the interface between the virtual machines 110, 112, 114 and the physical resources, including hardware 130, of the physical machine 102.

The physical machine 100 also includes an administrative virtual machine 138 which performs administrative tasks with respect to the physical machine 100. A migration engine 140 is contained in the administrative virtual machine 138, which migration engine 140 is used to manage the migration of virtual machines between physical machines. In a different implementation, the migration engine 140 can be outside the administrative virtual machine 138. Alternatively, the migration engine 140 can be omitted from the physical machine, with the migration engine contained in a central controller (not shown) used for selecting placement of virtual machines and managing migration of virtual machines between physical machines. In another alternative, the administrative virtual machine 138 can also be omitted.

The physical machine 102 similarly includes an administrative virtual machine that contains a migration engine 172.

The virtual machine monitor 132 of the physical machine 100 also includes a VMM kernel 142, which provides abstraction layers for the hardware 122. In accordance with some embodiments, the VMM kernel 142 is able to handle page faults (requests from virtual machines of data not present in the physical machine 100). As noted above, page faults can occur in the context of virtual machine migration where the virtual machine is migrated from an origination physical machine to a destination physical machine, and the virtual machine is started on the destination physical machine before all data that may be requested by the migrated virtual machine is transferred to the destination physical machine. For example, the virtual machine may have been migrated and started on the destination physical machine before the working set of the virtual machine has been transferred to the destination physical machine (100 in this example). A "working set" refers to the data of the virtual machine that is actively being used by the virtual machine. Before the working set is transferred to the destination physical machine, it is likely that execution of the migrated virtual machine on the destination physical machine will result in page faults, which are handled by the VMM kernel 142 in some embodiments. Alternatively, instead of implementing the page-fault handling mechanism in the VMM kernel, some other page-fault handling module can be provided by the virtual machine monitor 132 (or outside the virtual machine monitor 132).

The virtual machine monitor 134 in the physical machine 102 similarly includes a VMM kernel (and/or other page-fault handling module).

As further depicted in FIG. 1, the state information of the virtual machine 106 (VM1) includes VM1 state information 144 in the CPU 124 and VM1 state information 148 in the I/O device(s) 136. The VM1 state information 144 and VM1 state information 148 are stored in registers of the corresponding CPU 124 and I/O device(s) 136. Similarly, the state information of the virtual machine 108 (VM2) includes VM2 state information 146 in the CPU 124 and VM2 state information 150 in the I/O device(s) 136. Although not depicted, state information for the virtual machines 106, 108 can also be contained in the network interface 128 and/or other components.

The data associated with the virtual machines 106, 108 is contained in the memory 126, including VM1 data 152 and VM2 data 154. Each of the VM1 data 152, 154 includes software instructions and actual data (including user data, application data, and system data) associated with the corresponding virtual machine. Each of the VM1 data 152 and VM2 data 154 can include the working set of the corresponding virtual machine along with other data.

The hardware 130 of the physical machine 102 similarly includes state information and data associated with corresponding virtual machines in the physical machine 102.

The example system of FIG. 1 also includes a backing store 158, which can be a storage system made up of one or more storage devices. The backing store 158 is a central repository to store virtual machine data, e.g., virtual machine data 160, 161. Effectively, the memory (e.g., 126) of a physical machine is considered the cache for storing virtual machine data, whereas the backing store 158 is the secondary storage to store virtual machine data. The virtual machine data cached in the memory of the physical machine is usually a subset of the virtual machine data contained in the backing store 158. As execution of a virtual machine progresses, virtual machine data contained in the memory can be replaced with other virtual machine data by retrieving the data from the backing store 158.

The backing store 158 is coupled to the network 104 by a storage controller 156. Requests for virtual machine data can be sent to the storage controller 156 by the physical machines 100, 102. The storage controller 156 responds to the requests by retrieving the requested virtual machine data from the backing store 158. Also, virtual machine data in the memory of a physical machine can be modified during execution of a virtual machine (such modified data is referred to as "dirty" data). Periodically, or in response to some event, dirty data can be written back from the physical machine memory to the backing store 158.

Figure 2:
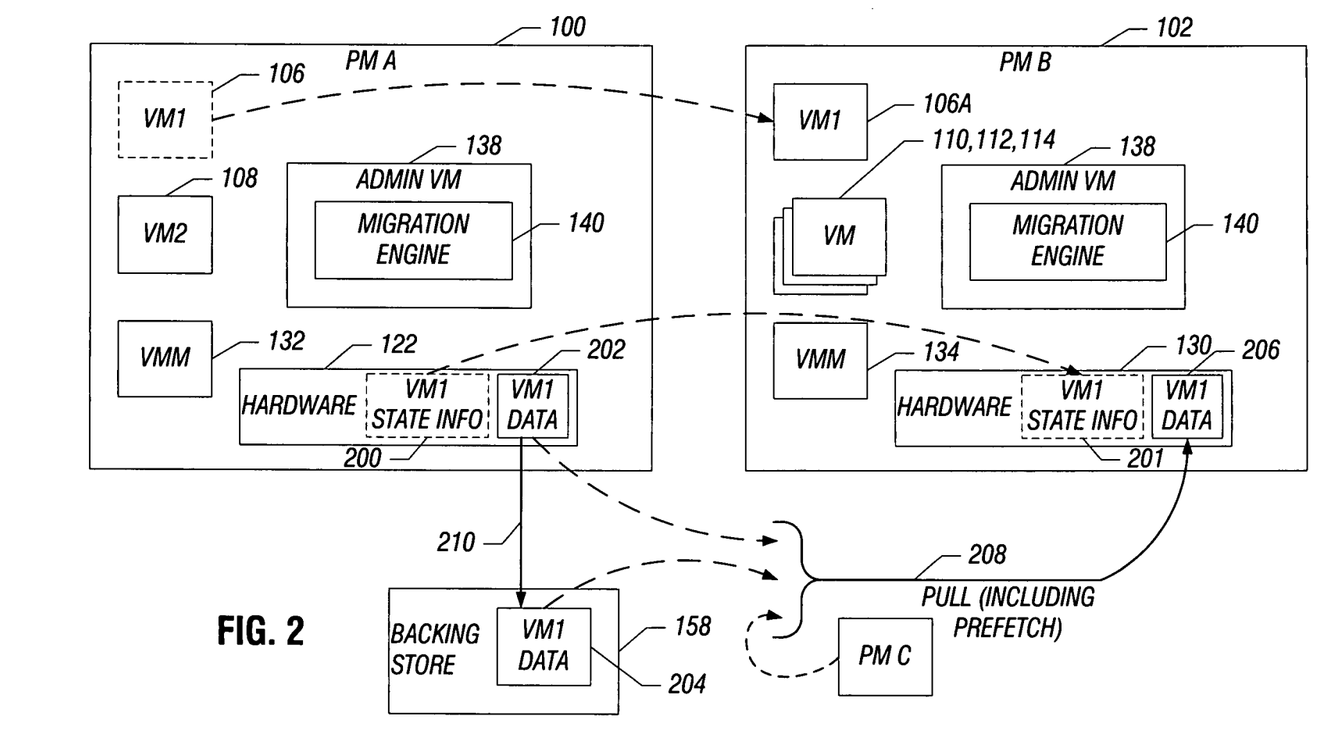
FIG. 2 illustrates an example of migration of a virtual machine between physical machines, in accordance with an embodiment.

FIG. 2 shows an example of migration of virtual machine 106 (VM1) from physical machine 100 (referred to as PM A) to physical machine 102 (referred to as PM B). Thus, in the example of FIG. 2, PM A is the origination physical machine and PM B is the destination physical machine for migration of VM1. In PM B, the virtual machine VM1 is identified by reference numeral 106A.

To migrate the virtual machine VM1, VM1's state information 200 contained in the hardware 122 of PM A is transferred to the hardware 130 of PM B. The migrated VM1 state information is referred to as VM1 state information 201 in PM B. Once the VM1 state information has been transferred from PM A to PM B, VM1 (106A) can start executing in PM B.

Note, however, that although VM1 has started executing in PM B, the VM1 data associated with VM1 may not necessarily be present in PM B. Thus, as VM1 executes in PM B, VM1 will issue requests for data that are not present in PM B, which causes page faults that are handled by the page-fault handling module in the VMM 134 (e.g., the page-fault handling mechanism of the VMM kernel). In response to a page-fault condition detected by the page-fault handling module, PM B issues request(s) over the network 104 (FIG. 1) for the requested VM1 data pages. Note that PM B does not necessarily know where the requested VM1 data pages are located. The requested VM1 data pages may still be residing in PM A. Alternatively, the VM1 data may be contained in the backing store 158. As yet another alternative, the requested VM1 data pages may be contained in another physical machine, such as PM C, depicted in FIG. 2.

The request(s) sent by PM B is (are) processed by one or more of PM A, the backing store 158, and PM C. Thus, the requested VM1 pages can be retrieved (at 208) from VM1 data 202 contained in the memory of hardware 122 in PM A, from VM1 data contained in the backing store 158, and/or from data contained in PM C. The demand-based retrieval of VM1 data is a pull technique of retrieved data.

Another feature according to some embodiments is the ability to prefetch virtual machine data. Prefetching is performed to retrieve more pages of data than those specifically requested by the executing virtual machine. It is likely that, in the near future, the executing virtual machine may request pages of data following the currently requested data page. Performance can be enhanced by prefetching pages since it reduces the likelihood of page faults. Prefetching of data that is highly likely to be used, such as that referenced by the program counter content of a CPU associated with the migrated virtual machine, is particularly useful, since the migrated virtual machine would not have to wait to begin executing on the destination physical machine while the program counter content is being retrieved.

FIG. 2 also shows a data path 210 from VM1 data 202 contained in PM A to the VM1 data 204 in the backing store 158. During migration of VM1 from PM A to PM B, the VM1 data 202 can also be written back to the backing store 158 in response to VM1 being stopped in PM A. This ensures that the VM1 data 202 associated with VM1 is available at least in the backing store 158. Note that just dirty pages in the VM1 data 202 have to be written back to the backing store 158. If VM1 data 202 contains all clean pages, then writeback to the backing store 158 does not have to be performed, since the backing store 158 contains the most up-to-date version of the VM1 data (with respect to PM A). Also note that any request for pages of VM1 data that are dirty in PM A has to be satisfied from the pages in PM A, and not from other sources such as the backing store 158 or PM C. PM A can transfer VM1 data back to the backing store 158 to clean the data (in other words, dirty or modified data is written back from PM A to the backing store).

Figure 3:
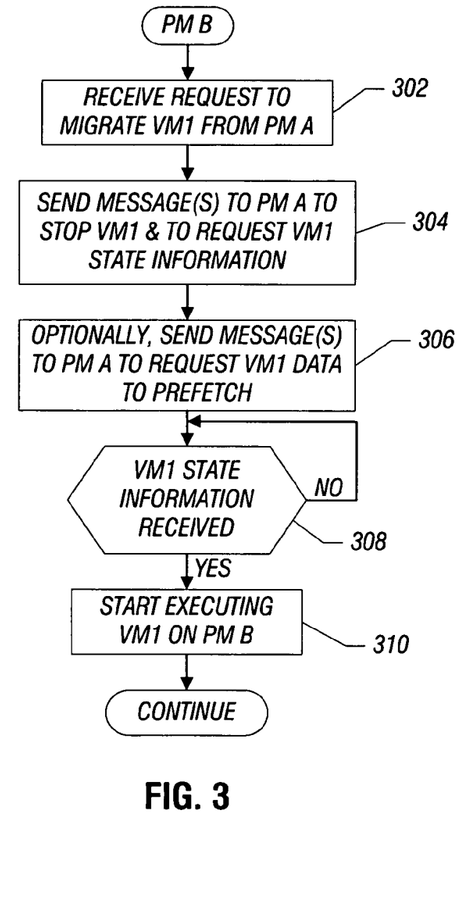
FIG. 3 is a flow diagram of a process of migrating a virtual machine, in accordance with an embodiment.

FIG. 3 shows a process of migrating a virtual machine from an origination physical machine to a destination physical machine. In the example referred to in FIG. 3, the origination physical machine is PM A, and the destination physical machine PM B. PM B receives (at 302) a request to migrate VM1 from PM A. This request can be received from the migration engine 140 (FIG. 1) in PM A or, alternatively, the request can be received from a central controller.

Next, PM B can send (at 304) one or more messages to PM A to stop VM1 and to request transfer of the VM1 state information. Note that step 304 can omitted if PM A is configured to automatically transfer state information upon receiving some indication that VM1 is to be migrated to PM B.

Optionally, PM B can send (at 306) one or more messages to PM A to request prefetch data for VM1. For example, part of the working set (or the entire working set) associated with VM1 can be prefetched from PM A to reduce the number of page faults associated with executing VM1 in PM B. In some implementations, the working set of a virtual machine can be identified to be the pages that were being referenced by the virtual machine in PM A just prior to migration.

PM B then determines (at 308) whether VM1 state information has been received. If so, PM B starts (at 310) executing VM1 on PM B.

Figure 4:
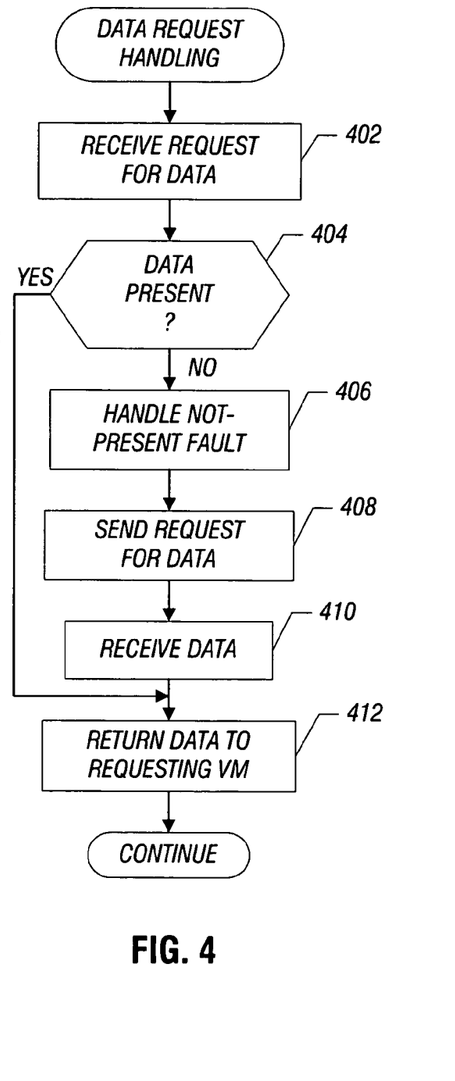
FIG. 4 is a flow diagram of a process of data request handling, in accordance with an embodiment.

FIG. 4 shows a process for performing data request handling. The process of FIG. 4 can be performed by the combination of the VMM kernel and the migration engine. The VMM kernel receives (at 402) a request for data from an executing virtual machine (such as from VM1 that has just been migrated to PM B). The VMM kernel (or some other page handling module) determines (at 404) whether the data is present in PM B. If so, the data is returned to the requesting virtual machine (at 412).

However, if the data is not present in PM B, then the VMM kernel handles (at 406) a not-present fault condition. The VMM kernel notifies the migration engine of this not-present fault condition. In response to the not-present fault condition, the migration engine sends (at 408) a request (or requests) over the network for the requested data. Alternatively, the request(s) for data response to the not-present fault condition can be performed by another module in the administrative virtual machine or other module. Upon receipt of the requested data (at 410) by PM B, the data is returned to the requesting virtual machine (at 412).

Figure 5:
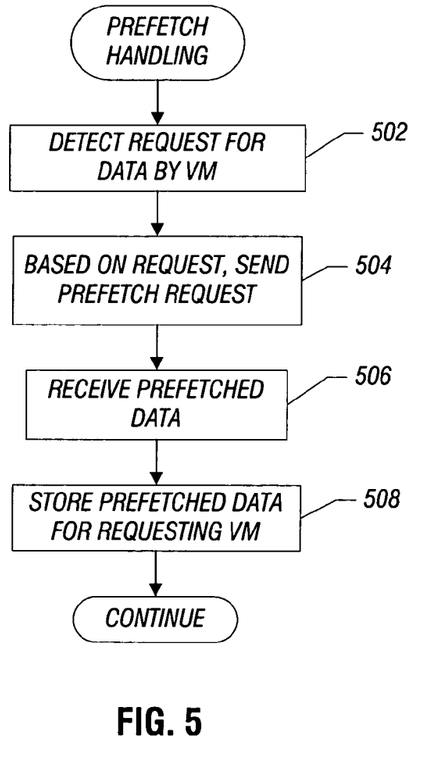
FIG. 5 is a flow diagram of a process of prefetch handling, in accordance with an embodiment.

FIG. 5 shows a prefetch handling process, which can be performed by a prefetch module. The prefetch module can be part of the virtual machine monitor or part of the migration engine, or the prefetch module can be a separate application running in the administrative virtual machine or elsewhere. The prefetch module detects a request for data by a virtual machine (at 502). Based on the request, the prefetch module determines what other data portions to retrieve. Then, the prefetch module sends (at 504) the prefetch request over the network. Note that the decision to perform prefetch can take into account available network bandwidth and usage of pages of data currently in memory. The prefetch module considers the benefit of prefetching versus the overhead of performing the prefetch. The prefetch module also considers the benefit of prefetching versus the cost of knocking other pages of data out of the memory. The prefetched data is received (at 506) in response to the prefetch request, with the prefetched data stored (at 508) to use for subsequent requests by the requesting virtual machine.

Figure 6:
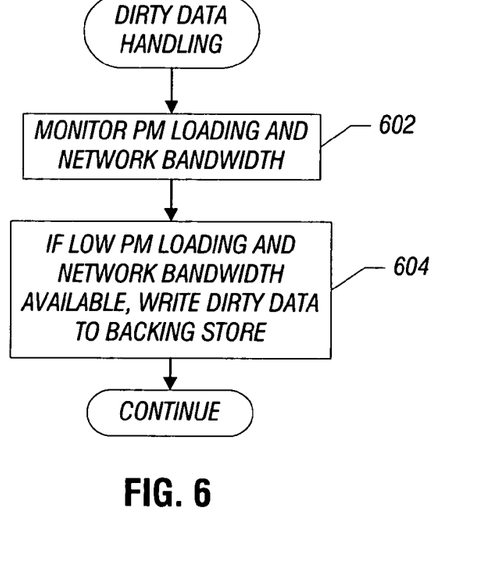
FIG. 6 is a flow diagram of a process of dirty data handling, in accordance with an embodiment.

FIG. 6 shows a dirty data handling process performed by a data synchronization module (e.g., which can execute in the virtual machine monitor, in the administrative virtual machine, or elsewhere). The synchronization module monitors physical machine loading and network bandwidth availability (at 602). During periods of low physical machine loading and if network bandwidth is available, the synchronization module can write dirty data to the backing store (at 604).

Instructions of software described above (including the VMM 132, 134, VMM kernel 142, administrative VM 138, 170, and migration engine 140, 172 of FIG. 1) are loaded for execution on a processor (such as one or more CPUs 124 in FIG. 1). The processor includes microprocessors, microcontrollers, processor modules or subsystems (including one or more microprocessors or microcontrollers), or other control or computing devices.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of migrating a virtual machine from a first physical machine to a second physical machine over a network, comprising:

stopping execution of the virtual machine in the first physical machine, wherein the first physical machine contains data referenced by the virtual machine;

to migrate the virtual machine from the first physical machine to the second physical machine, copying state information of the virtual machine from the first physical machine to the second physical machine;

starting execution of the virtual machine in the second physical machine based on the copied state information even though data referenced by the virtual machine prior to migration from the first physical machine to the second physical machine has not yet been transferred to the second physical machine;

retrieving, in response to demand by the virtual machine upon initial execution in the second physical machine after migration, data associated with the virtual machine from a source on the network;

in response to the demand, deciding whether or not to prefetch further data taking into account at least one factor selected from the group consisting of an available bandwidth of the network, and an effect of removing other data currently in a memory of the second physical machine to allow storage of the prefetched further data; and in response to deciding to prefetch the further data, prefetching the further data that is in addition to data requested by the virtual machine upon initial execution of the virtual machine in the second physical machine after migration.

2. The method of claim 1, wherein retrieving the data associated with the virtual machine from the source on the network comprises retrieving the data associated with the virtual machine from the first physical machine.

3. The method of claim 1, wherein retrieving the data associated with the virtual machine from the source on the network comprises retrieving the data associated with the virtual machine from a backing store.

4. The method of claim 1, wherein the data referenced by the virtual machine comprises a modified data portion, the method further comprising flushing the modified data portion stored in the first physical machine to a backing store after stopping the execution of the virtual machine in the first physical machine, the modified data portion being data accessed by the virtual machine when executing in the first physical machine.

5. The method of claim 1, wherein retrieving the data associated with the virtual machine is based on a demand paging technique.

6. The method of claim 1, wherein retrieving the data associated with the virtual machine comprises retrieving data in portions in response to different requests by the virtual machine executing in the second physical machine.

7. The method of claim 1, wherein the data referenced by the virtual machine comprises software instructions and actual data.

8. The method of claim 1, wherein the data referenced by the virtual machine prior to migration contained in the first physical machine comprises a working set of the virtual machine, and wherein starting execution of the virtual machine in the second physical machine is performed before transfer of the working set of the virtual machine to the second physical machine.

9. The method of claim 1, further comprising:

handling a fault condition in response to a request submitted by the virtual machine executing in the second physical machine for a data portion not present in the second physical machine; and in response to the fault condition, retrieving the data portion from the source on the network and performing the prefetching.

10. The method of claim 9, wherein handling the fault condition is performed by a virtual machine monitor in the second physical machine.

11. An article comprising at least one non-transitory computer-readable storage medium containing instructions that when executed cause a first computer to:

migrate a virtual machine from a second computer to the first computer;

start execution of the virtual machine in the first computer prior to a working set of data associated with the virtual machine being received by the first computer;

in response to a request for data by the virtual machine upon initial execution of the virtual machine in the first computer after migration, retrieve the requested data from a source on a network, wherein the requested data includes at least a portion of the working set;

in response to the request, decide whether or not to prefetch additional data taking into account at least one factor selected from the group consisting of an available bandwidth of the network, and an effect of removing other data currently in a memory of the first computer to allow storage of the prefetched additional data; and in response to deciding to prefetch the additional data, prefetch the additional data from the source.

12. The article of claim 11, wherein the working set of data associated with the virtual machine includes software instructions and actual data actively used by the virtual machine during execution of the virtual machine in the second computer prior to migration to the first computer.

13. The article of claim 11, wherein the instructions when executed cause the first computer to further retrieve other data associated with the virtual machine in response to further demand from the virtual machine executing in the first computer.

14. The article of claim 11, wherein migrating the virtual machine from the second computer to the first computer comprises:

causing execution of the virtual machine in the second computer to stop;

after execution of the virtual machine has stopped, receiving state information associated with the virtual machine from the second computer, wherein execution of the virtual machine in the first computer is started based on the received state information, wherein the state information comprise state information contained in at least a central processing unit and input/output device of the second computer.

15. A system comprising:

plural physical machines comprising first and second physical machines, wherein each of the first and second physical machines contains one or more virtual machines, wherein the first physical machine contains a migration engine to migrate a particular one of the one or more virtual machines in the first physical machine to the second physical machine, the migration engine to migrate the particular virtual machine by stopping execution of the particular virtual machine in the first physical machine and copying state information of the particular virtual machine to the second physical machine, wherein the second physical machine is configured to:

start execution of the particular virtual machine in the second physical machine based on the copied state information even though data referenced by the particular virtual machine prior to migration and contained in the first physical machine has not been copied to the second physical machine, in response to a request for data by the particular virtual machine upon initial execution of the particular virtual machine in the second physical machine, retrieve the requested data and prefetch additional data from a source on a network, in response to the request, decide whether or not to prefetch additional data taking into account at least one factor selected from the group consisting of an available bandwidth of the network, and an effect of removing other data currently in a memory of the second physical machine to allow storage of the prefetched additional data, and in response to deciding to prefetch the additional data, prefetch the additional data.

16. The system of claim 15, wherein the first physical machine comprises at least one central processing unit (CPU) and at least one input/output (I/O) device, and wherein the state information associated with the particular virtual machine is contained in the at least one CPU and at least one I/O device.

17. The system of claim 15, wherein the second physical machine comprises a virtual machine monitor to handle a page fault condition caused by the particular virtual machine executing in the second physical machine requesting data not present in the second physical machine.

* * * * *